(12) United States Patent
Mischler et al.

(10) Patent No.: US 7,547,270 B1
(45) Date of Patent: Jun. 16, 2009

(54) MACHINE TOOL WITH OPTIMALLY POSITIONED OPERATOR STATION

(75) Inventors: Peter L. Mischler, Rockton, IL (US); Randal S. VonMoll, Batavia, OH (US)

(73) Assignee: Cincinnati Machine, LLC, Hebron, KY (US)

( * ) Notice: Subject to any disclaimer, the term of this patent is extended or adjusted under 35 U.S.C. 154(b) by 0 days.

(21) Appl. No.: 12/099,512

(22) Filed: Apr. 8, 2008

(51) Int. Cl.
*B23Q 3/157* (2006.01)
*B23Q 11/08* (2006.01)

(52) U.S. Cl. .......................... 483/3; 409/134; 409/235; 74/608

(58) Field of Classification Search ................... 483/3; 409/134, 235; 408/234, 241 G; 74/608–609; 451/451, 455; 29/DIG. 86, DIG. 94; D15/131
See application file for complete search history.

(56) References Cited

U.S. PATENT DOCUMENTS

| | | | | |
|---|---|---|---|---|
| 3,355,799 A | * | 12/1967 | Daugherty | 483/3 |
| 4,742,609 A | * | 5/1988 | Neumann | 483/3 |
| 5,121,539 A | * | 6/1992 | Klingel | 483/53 |
| 5,265,497 A | * | 11/1993 | Curless | 74/608 |
| 6,077,206 A | * | 6/2000 | Azema | 483/3 |
| D584,322 S | * | 1/2009 | Arisue et al. | D15/122 |
| 2001/0041651 A1 | * | 11/2001 | Abe et al. | 483/3 |
| 2002/0022902 A1 | * | 2/2002 | Peek | 700/159 |
| 2002/0104935 A1 | * | 8/2002 | Schweizer | 248/131 |
| 2003/0050158 A1 | * | 3/2003 | Menzio | 483/3 |
| 2006/0270540 A1 | * | 11/2006 | Takayama et al. | 483/3 |
| 2007/0042882 A1 | * | 2/2007 | Konvicka et al. | 483/3 |

FOREIGN PATENT DOCUMENTS

JP 2000-317765 A * 11/2000

* cited by examiner

*Primary Examiner*—Erica E Cadugan
(74) *Attorney, Agent, or Firm*—Reising Ethington P.C.

(57) ABSTRACT

An operator station is positioned on the outside of a machine tool on the same side of the machine as the tool magazine and the automatic tool changer, to improve the ergonomics of the machine by keeping the tool loading access as close as possible to the operator. This location also allows easy visual access to the tools in the magazine and in the ready position in the tool changer. An angled "tunnel" window passing across the front of the tool magazine and the Y-axis column allows direct visual observation of the working zone of the machine tool from the operator station. A door on the side of the machine allows access from the operator station to a utilities panel located just inside of the door permitting ready operator access to switches, valves, fill points, filters and gages that are located on the panel.

9 Claims, 5 Drawing Sheets

MACHINE TOOL WITH OPTIMALLY POSITIONED OPERATOR STATION

FIELD OF THE INVENTION

A machine tool has an operator station that allows the operator to monitor the operation of the working tool in the workzone, has access doors to the workzone and the machine's utility panel, and is positioned on the same side of the machine tool as the tool magazine.

BACKGROUND OF THE INVENTION

Although modern machine tools are computer controlled, an operator is required to program the machine, and the operator often monitors the operation of the machine to make sure that it follows the intended sequence of operations, and that breakdowns do not occur. In order to do this efficiently, the operator should be able to view the operating tool in the workzone from the operator station. Additionally, the operator should also be able to see the tools in the tool magazine, and to monitor the operation of the automatic tool changing mechanism from the operator station to watch for any malfunction of the mechanism, or for a broken tool that is returned by the mechanism to the tool magazine. Additionally, the switches, valves, and controls for the machine's utilities should be visible and accessible from the operator station.

BRIEF SUMMARY OF THE INVENTION

An operator station with a control panel is positioned on the outside of a machine tool, and the tool magazine and automatic tool changer system are located on the same side of the machine as the operator station. The operator station location allows easy visual access to the tools in the tool magazine and in the ready position in the tool changer. An angled "tunnel" window passing across the front of the Y-axis column allows direct visual observation of the working zone from the operator station. Doors allow access from the operator station to the workzone of the machine and to a utilities panel located just inside of the door permitting ready operator access to the switches, valves, fill points, filters and gages that are located on the panel. An access hatch on the machine guarding that is close to the operator station provides access to the tool magazine for manual tool replacement. This arrangement improves the ergonomics of the machine by keeping the tool loading access as close as possible to the operator.

DETAILED DESCRIPTION OF THE INVENTION

Figure 1:
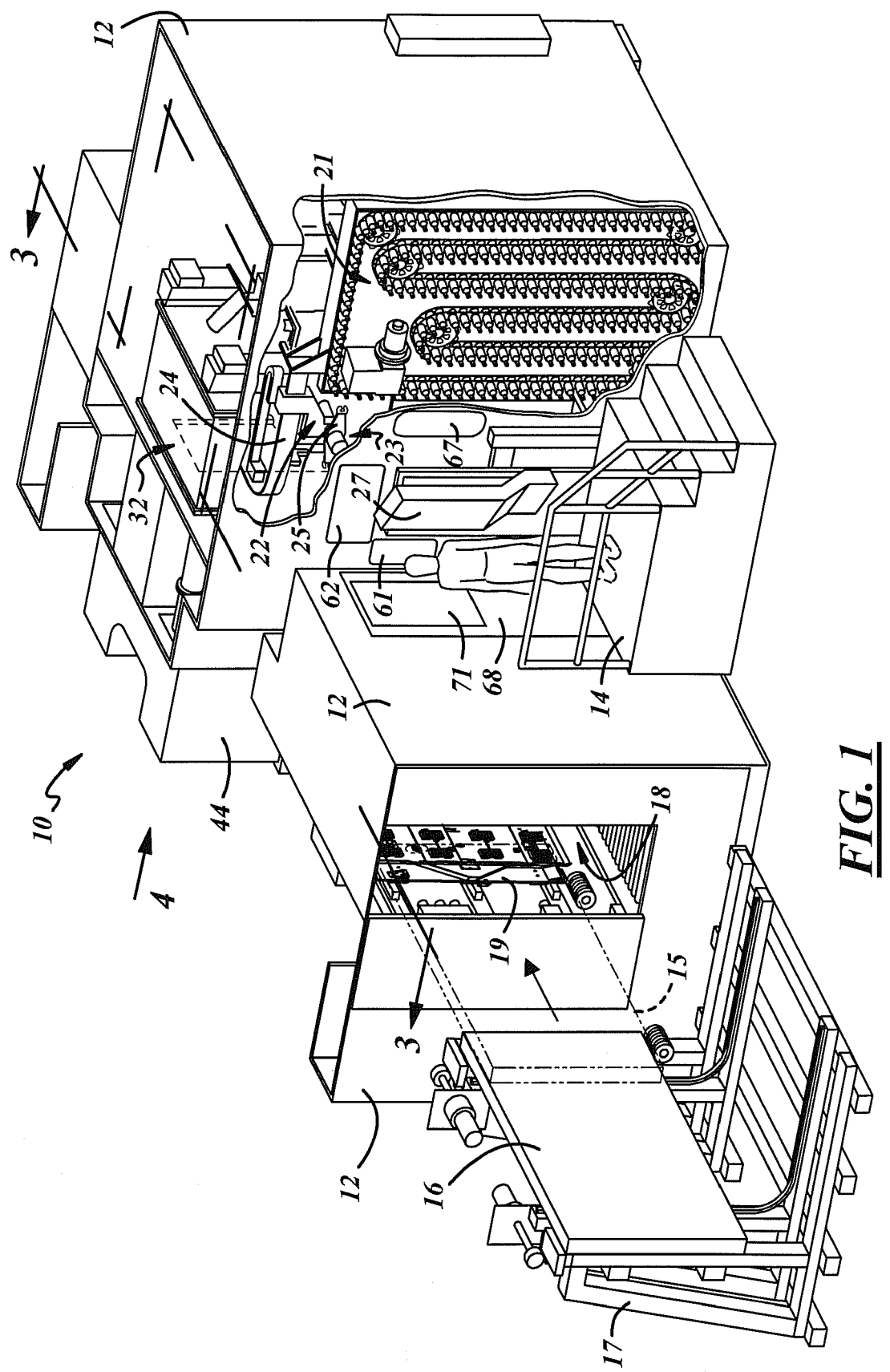
FIG. 1 is a perspective view of a machine tool according to the invention.

FIG. 1 shows a machine tool generally designated by the reference numeral 10. The machine tool is surrounded by standard guarding 12, and an operator station 14 is positioned outside of the guarding. The machine tool receives a pallet 15 from the pallet support plate 16 of a pallet manipulator 17 that may be positioned adjacent to a pallet access opening 18 in the guarding. The pallet 15 is transferred from the pallet manipulator 17 to a pallet receiver 19 that is a part of the machine. The pallet receiver 19 is then driven to the working zone of the machine in front of the spindle and the working tool. During normal operation, a workpiece 16 will be clamped to the pallet 15 as shown in FIG. 2.

The operator viewing station 14 is positioned to allow the operator to view the tool magazine 21 and the automatic tool changing mechanism 22 inside of the guarding from the operator station 14. The tool magazine 21 and tool changing mechanism 22 are located just inside of the guarding from the operator station, and on the same side of the Y-axis column as the operator station 14 to improve the ergonomics of the system by keeping the tool changing mechanism as close as possible to the operator. The automatic tool changer 22 comprises a two-handed traveling tool changer arm 23 that is mounted on a track 24. A first end 25 of the arm 23 removes a first tool from the tool magazine 21 and moves from a position adjacent the tool magazine to a position adjacent the spindle head. The second end of the arm then removes a second tool from the spindle head and uses the first end of the arm to place the first tool in the spindle head in a manner that is well known in the art. The operator station 14 includes a standard control panel 27 by means of which the operator can program and operate the machine 10.

Figure 2:
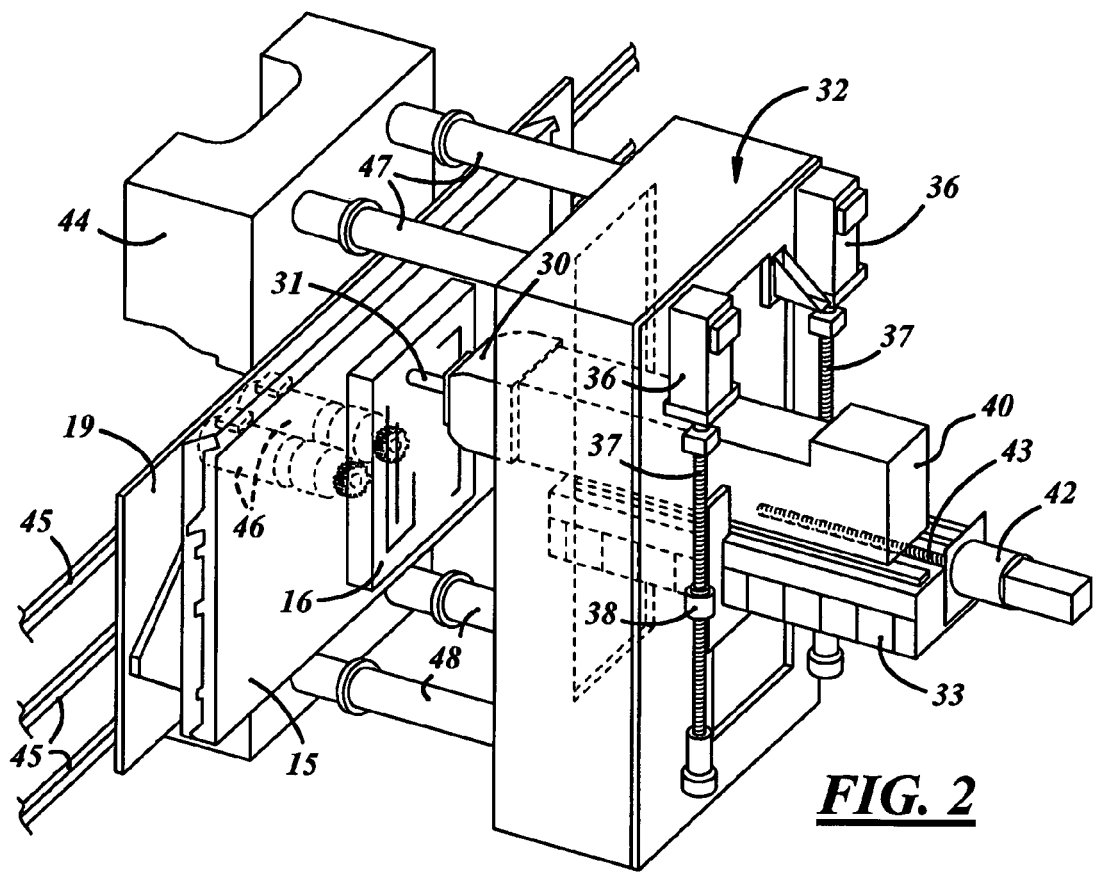
FIG. 2 is a simplified view of the machine tool of FIG. 1 showing the working tool in the working zone.

FIG. 2 shows the X, Y, and Z-axis elements of the machine tool. A pallet 15 with a workpiece 16 is positioned in front of a spindle or multi-axis head 30 that carries the working tool 31 and this establishes a workzone. The Y-axis column 32 is fixed and is bifurcated. As shown in FIG. 2 and also in FIG. 3, the Y-axis column 32 carries a vertically movable saddle 33 that is mounted on vertical linear guides or ways 34 best seen in FIG. 3. A servomotor 36 is mounted on each side of the Y-axis column 32, and each servomotor 36 is coupled to a drive screw 37. The drive screws 37 engage drive nuts 38 on opposite sides of the saddle 33, and the servomotors 36 are used to raise and lower the saddle to the desired vertical position. The vertically movable saddle 33 carries a Z-axis slide 40. A Z-axis drive assembly 41 comprises a servomotor 42 and a drive screw 43 that are mounted on the Z-axis saddle. The Z-axis drive assembly 41 may be selectively controlled to position the Z-axis slide 40 and the working tool 31 in the desired position along the Z-axis.

Figure 4:
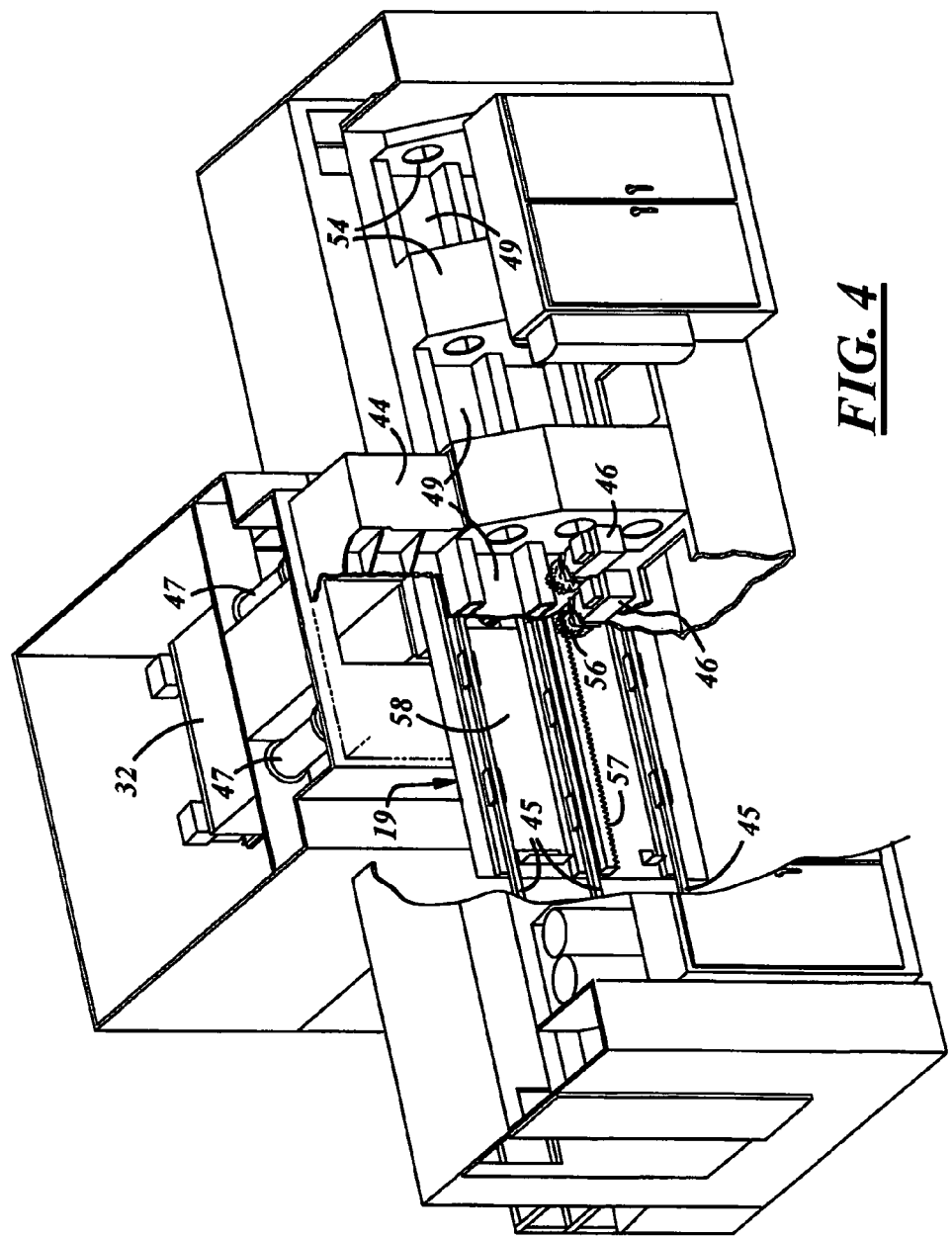
FIG. 4 is a perspective view partly broken to show the X-axis frame members, the back of the pallet receiver and the X-axis drive.

An X-axis frame member 44 supports an X-axis wall 49, best seen in FIG. 4. A plurality of X-axis rails 45 is mounted on the X-axis wall 49. The pallet receiver 19 is mounted on the X-axis rails 45 for horizontal movement along the X-axis. One or more X-axis drive motors 46 shown in phantom are mounted on an X-axis wall 49 to drive the pallet receiver back and forth along the X-axis rails. The X-axis frame member 44 is coupled to the Y-axis column 32 by upper and lower tubular frame members 47 and 48, respectively.

Figure 3:
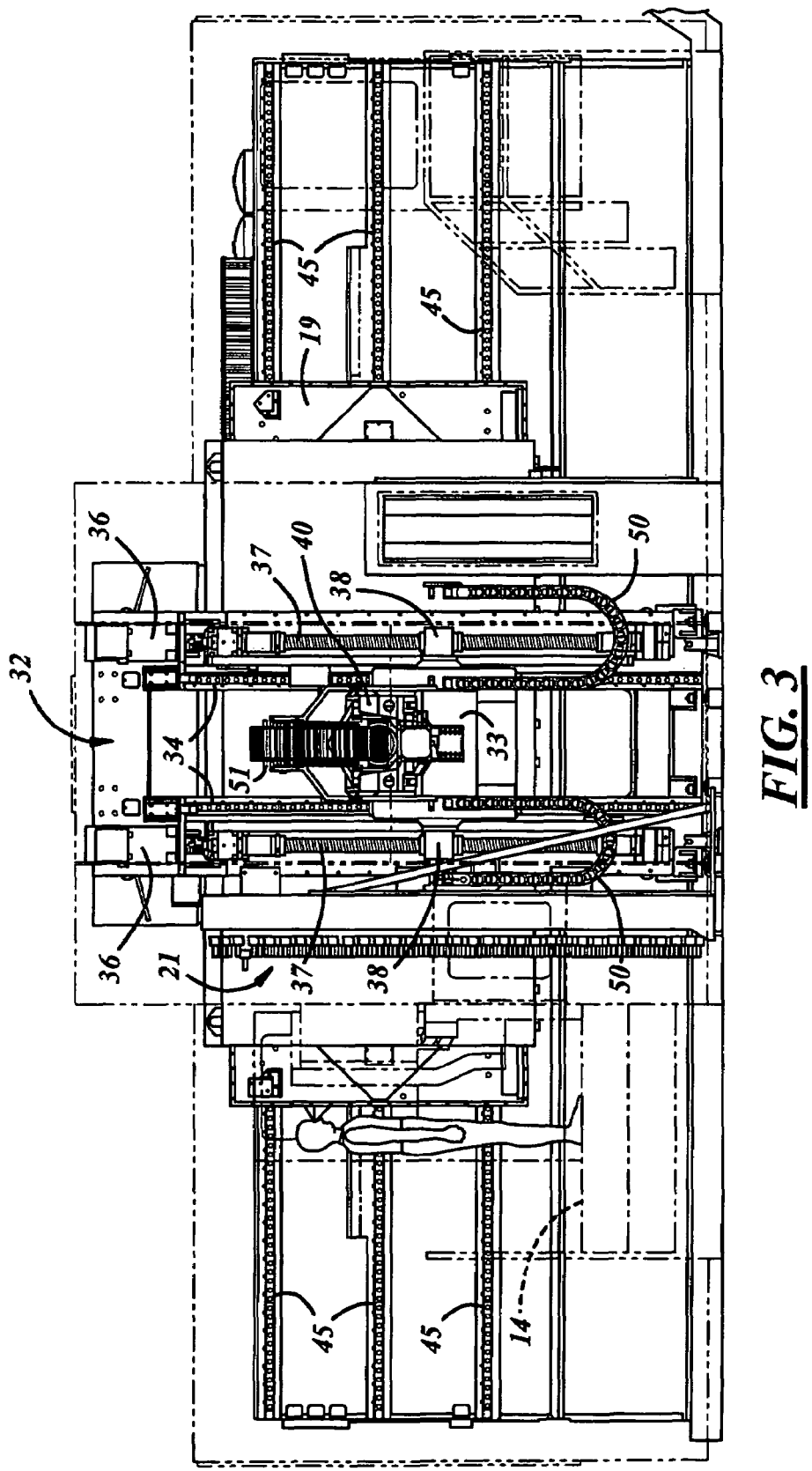
FIG. 3 is a sectional view taken along 3-3 of FIG. 1 showing the operator station in relation to tool magazine and the Y-axis column.

FIG. 3 shows certain elements of the machine in greater detail. Two Y-axis ways 34 that guide the vertical movement of the saddle 33 are positioned on the bifurcated Y-axis column 32 on either side of the saddle. Two Y-axis flexible cable guides 50 are provided to carry electrical and hydraulic cables and the like from the stationary part of the Y-axis column to the movable saddle 33. A Z-axis flexible cable guide 51 is provided to carry electrical and hydraulic cables from the saddle 33 to the Z axis slide 40. FIG. 3 shows the X-axis rails 45 that extend from one side of the machine to the other to support the pallet receiver 19 and to position the workpiece in front of the working tool. The pallet receiver 19 is centered in front of the Y-axis column. FIG. 3 also shows that the tool magazine 21 is mounted between the Y-axis column 32 and the operator station 14 to provide both visual and physical access to the tool magazine from the operator station.

FIG. 4 is a perspective view of the back of the machine tool showing the X-axis frame members 44 and 54 that support the X-axis wall 49. The X-axis drive motors 46 are mounted on the X-axis wall 49, and the X-axis rails 45 are mounted on the X-axis wall. The output shafts of the drive motors are provided with pinion gears 56. The pinion gears 56 engage an elongated rack 57 on the rear face 58 of the pallet receiver 19. The pallet receiver 19 may be driven back-and-forth across the X-axis rails 45 by the X-axis drive motors 46. In the embodiment shown, two X-axis drive motors 46 are used, although other drive configurations are possible.

Figure 5:
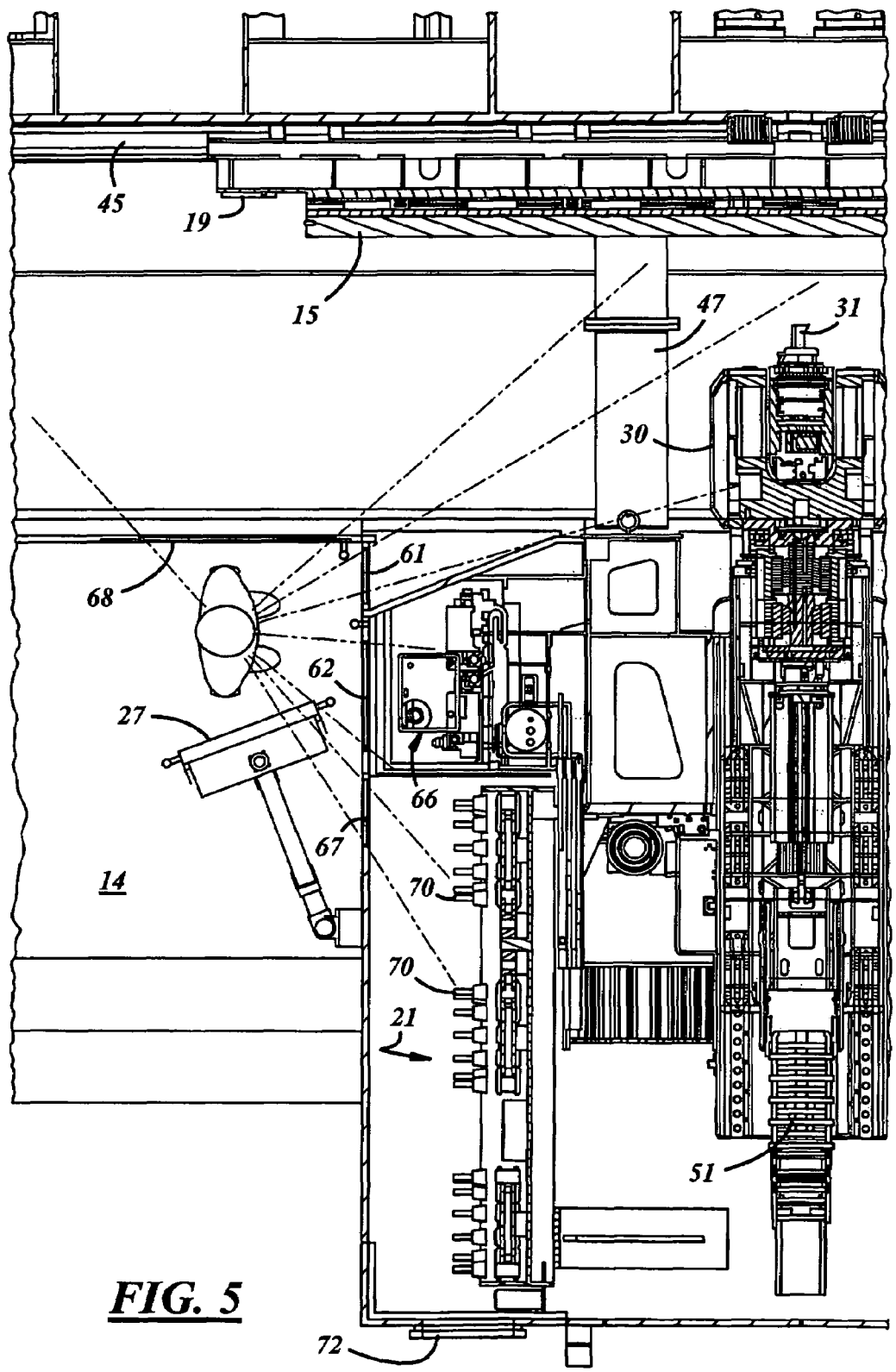
FIG. 5 is a plan view of the left side of the machine tool of FIG. 1 showing the sight lines from the operator station.

FIG. 5 is a plan view of the left side of the machine tool of FIG. 1 showing the operator station 14, and the sightlines from the operator station to the various parts of the machine tool. A first sightline from the operator station through a machining observation window 61 is in the direction of the working tool 31. The spacing between the upper and lower tubular frame members 47 and 48 that couple the X-axis frame member 44 to the Y-axis column 32 as shown in FIG. 2 allows visual access so that the operator can see the working tool 31 in the workzone. The second sightline through an overhead tool changer window 62 allows the operator to see the automatic tool changer 22 when it is adjacent to the tool magazine 21. The third sightline through a utilities window 63 in the utilities access door 64, best seen in FIG. 6, allows the operator to see the utilities panel 66. The fourth sightline through a tool viewing window 67 allows the operator to see the tools 70 in the tool magazine 21. The workzone access door 68 to the left of the operator provides a passageway through the guarding 12 and allows the operator to enter the workzone. The workzone access door will normally be provided with an interlock so that it will not open while the machine is in operation.

Figure 6:
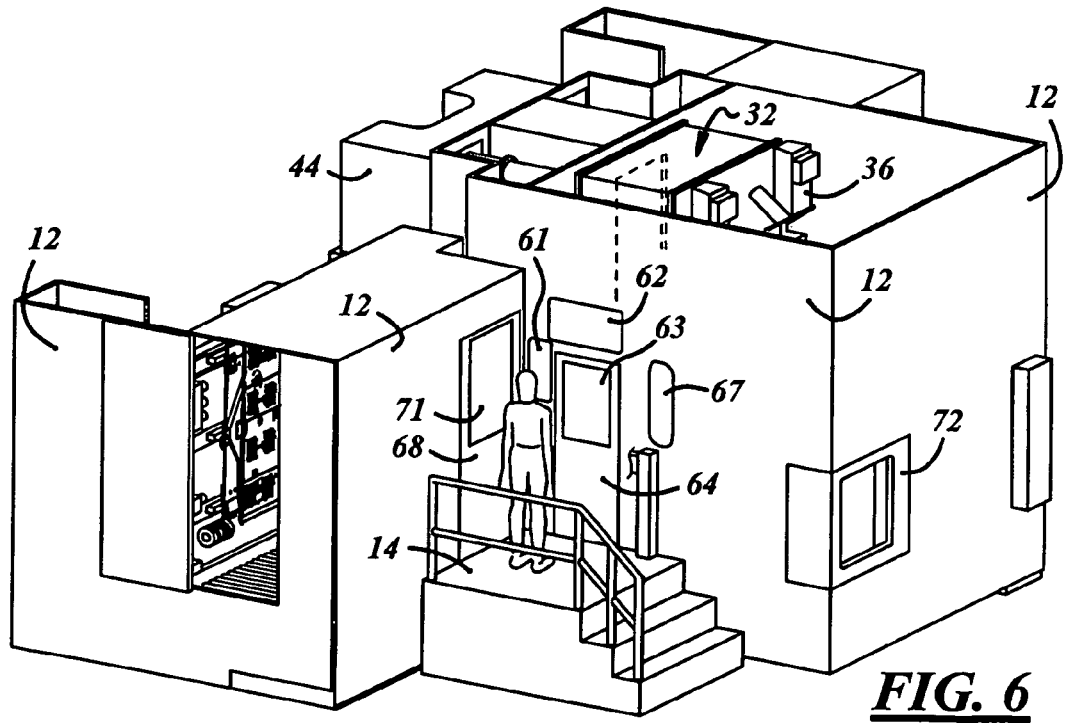
FIG. 6 is a perspective view showing the doors and windows that open onto the operator station.

FIG. 6 shows the operator station with the control panel 27 removed to better show the doors and windows that open onto the operator station. The tool viewing window 67 allows the operator to visually inspect the tools in the tool magazine. The tool changer window 62 allows the operator to monitor the operation of the tool changer mechanism 22 as it removes and replaces tools relative to the tool magazine. The machining observation window 61 allows the operator to view the workpiece and the working tool when the machine is in operation. The workzone access door 68 opens from the operator station to the interior of the machine to allow the operator access to the workzone to inspect the workpiece 16 or the spindle head 30. The window 71 in the workzone access door 68 provides visual observation of the X-axis rails 45 and the pallet receiver 19 even when the door 68 is closed.

The utilities access door 64 in front of the operator allows the operator to enter the machine to service the utilities panel 66. The majority of the machine's utilities such as switches, valves, fill points, filters and gages and the like are located on the utility panel making them readily accessible from the operator's normal position at the operator station 14, thus enhancing the preventative maintenance and early diagnostics of impending faults before they shut-down operation of the machine. When the utilities access door 64 is closed, the utilities panel is visible through the utilities window 63 in the door.

FIG. 6 also shows the tool access hatch 72 that provides access to the interior of the guarding 12 to allow an operator to manually remove and replace broken or worn tools in the tool magazine. The tool access hatch 72 is conveniently located in close proximity to the operator station 14.

Having thus described the invention, various alterations and modifications may be apparent to those skilled in the art, which modifications and alterations are to be considered to be within the scope of the invention as defined by the appended claims.

We claim:

1. A machine tool having generally perpendicular X, Y, and Z axes of movement, and the machine tool having a working zone containing a working tool, the machine tool comprising:
   a Y-axis column;
   a tool magazine mounted on the side of the Y-axis column;
   an automatic tool changer for the tools in the tool magazine;
   guarding surrounding the X, Y, and Z axes of the machine tool, the Y-axis column, the tool magazine and the automatic tool changer;
   an operator station for the machine tool including a control panel for the machine tool and located on the outside of the guarding and positioned on the same side of the machine tool as the tool magazine and the automatic tool changer such that the tool magazine and tool changer are located between the operator station and the working zone, whereby an operator has visual access to the tool magazine and the automatic tool changer from the operator station;
   a machining observation window in the guarding at the operator station; and
   a first sightline from the operator station through the machining observation window to the working tool, whereby the operator has visual access to the working tool from the operator station.

2. The machine tool of claim 1, wherein the control panel is usable to enable the operator to program and operate the machine tool.

3. The machine tool of claim 1 wherein the working zone is located at a front of the Y-axis column and is positioned between the Y-axis column and the X-axis of the machine tool, and the first sightline passes in front of the Y-axis column.

4. The machine tool of claim 1 further comprising:
   a sightline from the operator station through a tool changer window in the guarding, the sightline providing visual access from the operator station to the automatic tool changer when the automatic tool changer is adjacent to the tool magazine.

5. The machine tool of claim 1 further comprising:
   a utilities panel for the machine tool positioned inside of the guarding, the utilities panel containing switches, valves, fill points, filters and gages for the machine tool; and,
   an access door in the guarding at the operator station providing access from the operator station to the utilities panel.

6. The machine tool of claim 5 further comprising:
   a utilities window in the utilities access door; and
   a sightline through the utilities window in the utilities access door providing visual access of the utilities panel from the operator station.

7. The machine tool of claim 6 further comprising:
a tool viewing window in the guarding at the operator station and a further sightline through the tool viewing window, the further sightline providing visual access the tools in the tool magazine from the operator station.

8. The machine tool of claim 1 further comprising:
a workzone access door in the guarding from the operator station to the interior of the machine tool, the workzone access door providing access to the workzone of the machine tool.

9. The machine tool of claim 1 further comprising:
a tool access hatch in the guarding in close proximity to the operator station,
the tool access hatch providing access to the tool magazine for manual removal and replacement of tools in the tool magazine.

\* \* \* \* \*

UNITED STATES PATENT AND TRADEMARK OFFICE
CERTIFICATE OF CORRECTION

PATENT NO. : 7,547,270 B1
APPLICATION NO. : 12/099512
DATED : June 16, 2009
INVENTOR(S) : Mischler et al.

Page 1 of 1

It is certified that error appears in the above-identified patent and that said Letters Patent is hereby corrected as shown below:

Col. 5, line 4 after "access" insert --to--

Signed and Sealed this

Thirtieth Day of November, 2010

David J. Kappos
*Director of the United States Patent and Trademark Office*